(12) United States Patent
Sato

(10) Patent No.: US 11,413,908 B2
(45) Date of Patent: Aug. 16, 2022

(54) PNEUMATIC TIRE

(71) Applicant: The Yokohama Rubber Co., LTD., Tokyo (JP)

(72) Inventor: Kenichi Sato, Tokyo (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/965,594

(22) PCT Filed: Dec. 17, 2018

(86) PCT No.: PCT/JP2018/046352
§ 371 (c)(1),
(2) Date: Jul. 28, 2020

(87) PCT Pub. No.: WO2019/150797
PCT Pub. Date: Aug. 8, 2019

(65) Prior Publication Data
US 2021/0039449 A1 Feb. 11, 2021

(30) Foreign Application Priority Data
Jan. 30, 2018 (JP) .............................. JP2018-013651

(51) Int. Cl.
*B60C 13/02* (2006.01)
*B60C 13/00* (2006.01)

(52) U.S. Cl.
CPC ............ *B60C 13/02* (2013.01); *B60C 13/001* (2013.01)

(58) Field of Classification Search
CPC ....... B60C 13/001; B60C 13/02; B60C 13/00; B60C 13/002
See application file for complete search history.

(56) References Cited

U.S. PATENT DOCUMENTS 5,728,242 A 3/1998 Barrese et al.
6,032,711 A 3/2000 Barrese et al.
(Continued)

FOREIGN PATENT DOCUMENTS

DE 102013108786 A1 * 2/2015 ........... B60C 13/001
JP H09-039518 2/1997
(Continued)

OTHER PUBLICATIONS

Machine Translation: DE-102013108786-A1; Rittweger Stefan; (Year: 2021).*
(Continued)

*Primary Examiner* — Kendra Ly
(74) *Attorney, Agent, or Firm* — Thorpe North & Western

(57) ABSTRACT

A pneumatic tire has a side portion located between a tread portion and a bead portion which includes a decorative element. The decorative element comprises protrusions extending along the side portion and bending to form a hook. The protrusions are disposed at intervals with tips of the hooks aligned in the same direction. Each of the protrusions includes a first and second portions. The first portion extends from an inner side in the radial direction to an outer side in the radial direction. The second portion extends from a bend position of each one of the protrusions and forms an angle of 90° or greater with the first portion at the bend position. Each bend position mutually differs in position in the radial direction between the protrusions, and the interval between adjacent protrusions is wider at the second portion than at the first portion.

19 Claims, 5 Drawing Sheets

(56) References Cited

U.S. PATENT DOCUMENTS

| | | | |
|---|---|---|---|
| 6,612,352 B1 | 9/2003 | Barrese et al. | |
| 2015/0041037 A1* | 2/2015 | Mukai | B60C 13/02 |
| | | | 152/523 |
| 2018/0141391 A1 | 5/2018 | Tokizaki | |

FOREIGN PATENT DOCUMENTS

| | | | |
|---|---|---|---|
| JP | H11-198614 | | 7/1999 |
| JP | 2001191745 A | * | 7/2001 |
| JP | 2004-017828 | | 1/2004 |
| JP | 2004-017829 | | 1/2004 |
| JP | 3946850 | | 7/2007 |
| JP | 4011984 | | 11/2007 |
| JP | 2012188037 A | * | 10/2012 |
| JP | 2015-033983 | | 2/2015 |
| JP | 2018052173 A | * | 4/2018 |
| WO | WO 2016/208212 | | 12/2016 |

OTHER PUBLICATIONS

Machine Translation: JP-2001191745-A; Kajikawa, Hidechika; (Year: 2021).*
Machine Translation: JP-2012188037-A; Itoi, Hirota; (Year: 2021).*
Machine Translation: JP-2018052173-A; Miyakoshi Yuta; (Year: 2021).*
International Search Report for International Application No. PCT/JP2018/046352 dated Mar. 19, 2019, 4 pages, Japan.

* cited by examiner

PNEUMATIC TIRE

TECHNICAL FIELD

The present technology relates to a pneumatic tire.

BACKGROUND ART

Tires are generally manufactured by pressurizing, heating and vulcanizing in a mold. During manufacture, a recess may form in the surface of the tire if vulcanizing is performed with air remaining between the mold and the rubber, and this may impair the appearance of the tire. To prevent such defects occurring in the tire surface, the tire is sometimes manufactured in a way that prevents air from remaining between the mold and the rubber through, for example, forming recesses and protrusions that extend in a stripe shape on an inner surface of the mold corresponding to a side portion of the tire to facilitate rubber flow in the mold.

The recesses and protrusions are transferred to the surface of the tire molded using such a mold to form a decorative pattern consisting of a plurality of protrusions (ridges) extending in a stripe shape aligned in a row. One known tire in the related art includes a side portion with a surface decorated with a plurality of protrusions in order to reduce the appearance of recesses/protrusions on the surface of the side portion caused by a structure such as a carcass ply member (see Japan Patent Nos. 3946850 and 4011984).

There is a problem in that the surface of a tire decorated with protrusions is more likely than a smooth surface to retain mud or the like that has adhered during travel and is difficult to keep clean.

SUMMARY

The present technology provides a pneumatic tire that can keep a surface of a side portion decorated with protrusions clean.

One aspect of the present technology is a pneumatic tire. A side portion located between a tread portion and a bead portion includes a decorative element. The decorative element includes a plurality of protrusions extending along a surface of the side portion and bending to form a hook shape. The plurality of protrusions are disposed at intervals with tips of the hooks aligned in the same direction, each one of the plurality of protrusions includes a first portion and a second portion. The first portion is extending from an inner side in a tire radial direction to an outer side in the tire radial direction, and the second portion is extending from a bend position of each one of the plurality of protrusions and forming an angle of 90° or greater with the first portion at the bend position. Each bend position mutually differs in position in the tire radial direction between the plurality of protrusions, and the interval between adjacent protrusions is wider at the second portion than at the first portion.

Each of the protrusions includes one of the bend positions. In other words, the number of the bend positions in each of the protrusions is one.

Preferably, the first portion and the second portion both extend linearly.

The interval between adjacent protrusions preferably widens stepwisely or continuously as the interval advances from an inner end of the first portion in the tire radial direction toward the tip of the second portion.

The extending directions of the second portions are preferably mutually parallel between the plurality of protrusions.

The length of the second portion in the extending direction preferably increases as the bend position of each one of the plurality of protrusions is located further outward in the tire radial direction The length of the first portion in the extending direction is preferably longer than the length of the second portion in the extending direction, and the ratio of the length of the second portion in the extending direction to the length of the first portion in the extending direction preferably increases as the bend position of each one of the plurality of protrusions is located further outward in the tire radial direction.

The bend position included in the decorative element is preferably located on a straight line extending from the inner side in the tire radial direction to the outer side in the tire radial direction.

The straight line preferably extends so as to intersect with each of the extending direction of the first portion and the extending direction of the second portion, and an angle formed between the straight line and the second portion is preferably larger than an angle formed between the straight line and the first portion.

The angles respectively refers to the smaller angle of the angles formed between the straight line and the second portions, and the smaller angle of the angles formed between the straight line and the first portions.

Ends of the second portions closer to the tips are preferably aligned in a direction parallel with the extending direction of the first portion.

The second portion preferably extends at an inclination angle of 45° or less with respect to a tire circumferential direction.

The first portion preferably extends at an incline with respect to the tire radial direction and the tire circumferential direction.

The bend positions of 80% or more of the plurality of protrusions of the total number of the plurality of protrusions included in the decorative element are preferably located further outward in the tire radial direction than a position in the tire radial direction at which the tire maximum width is located.

The side portion preferably includes the decorative element in each of a plurality of regions aligned in the tire circumferential direction, and the decorative elements are preferably disposed at an interval greater than an interval between adjacent first portions in the plurality of regions.

When defining the plurality of protrusions as first protrusions, second protrusions are preferably disposed in the regions in addition to the first protrusions. The second protrusions are preferably extending from the inner side in the tire radial direction toward the outer side in the tire radial direction without being bent and disposed at intervals from the first portions of the first protrusions.

According to the present technology, there is provided a pneumatic tire that can keep a surface of a side portion decorated with protrusions clean.

DETAILED DESCRIPTION

The pneumatic tire according to the present embodiment (hereinafter also called a "tire") to be described below is a tire for a passenger vehicle. A tire for a passenger vehicle refers to a tire specified in Chapter A of the JATMA Year Book 2015 (standards of The Japan Automobile Tyre Manufacturers Association). The tire can also be a small truck tire specified in Chapter B or a truck tire or bus tire specified in Chapter C.

Figure 1:
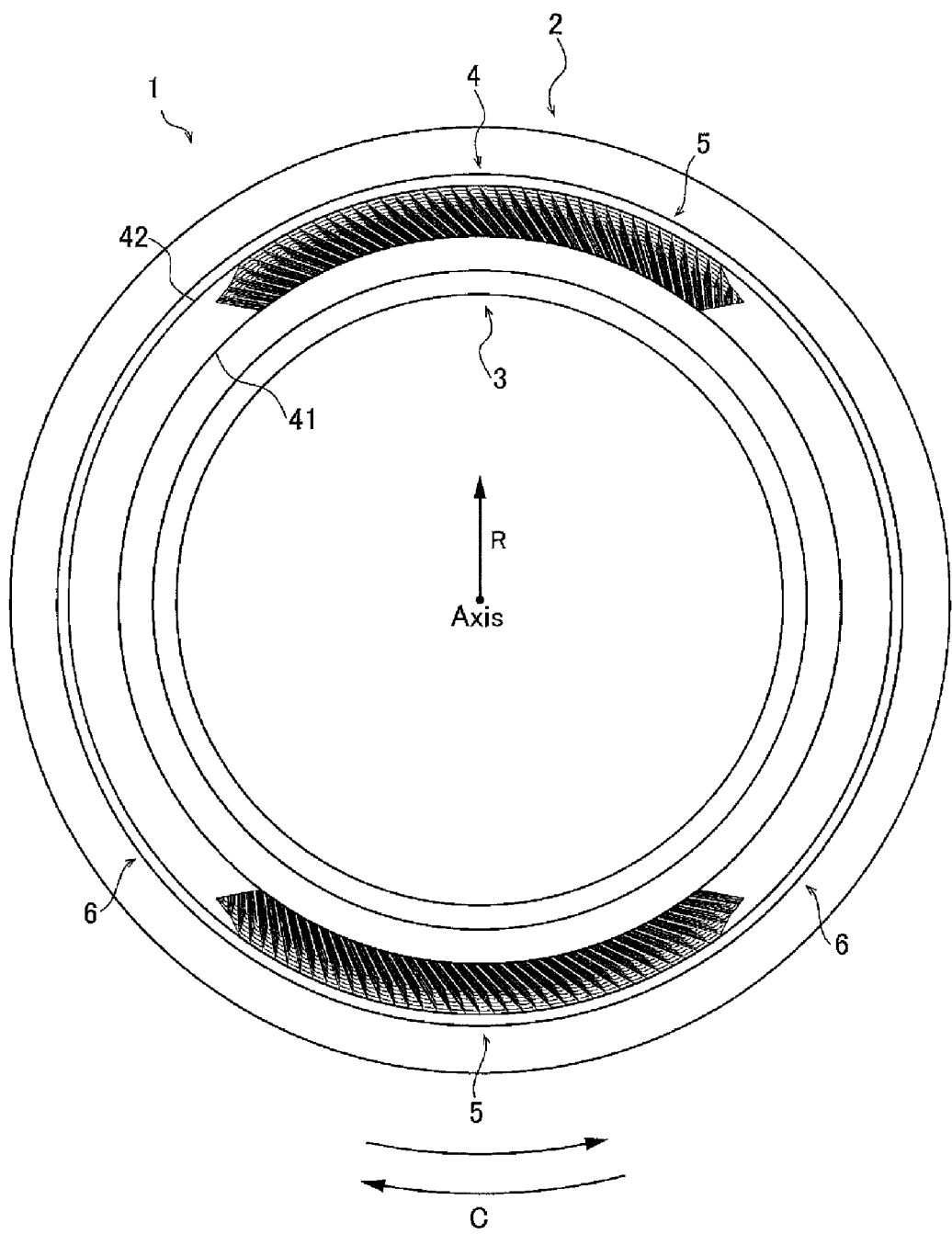
FIG. 1 is a diagram illustrating a pneumatic tire according to the present embodiment viewed from the side.

FIG. 1 is a diagram illustrating a pneumatic tire according to the present embodiment viewed from the side.

"Tire lateral direction" is the direction parallel with a rotation axis Axis of a tire 1. The outer side in the tire lateral direction is a side distant from a tire centerline representing a tire equatorial plane in the tire lateral direction. "Tire equatorial plane" is a plane orthogonal to the rotation axis Axis and passes through the center of the tire width of the tire 1. The inner side in the tire lateral direction is a side approaching the tire centerline in the tire lateral direction. A tire circumferential direction C is the direction in which the tire 1 rotates with the rotation axis Axis of the tire 1 as the center of rotation. A tire radial direction R is the direction orthogonal to the rotation axis Axis of the tire 1. The outer side in the tire radial direction is a side distant from the rotation axis Axis. The inner side in the tire radial direction is a side approaching the rotation axis Axis.

The tire 1 includes a tread portion 2 including a surface that makes contact with a road surface, a bead portion 3 that includes a bead core (not shown) and makes contact with a rim when the tire 1 is mounted on a rim, and a side portion 4 located between the tread portion 2 and the bead portion 3. The tire 1 also includes a carcass layer, an innerliner layer, and a belt layer that are not illustrated. The side portion 4 and the bead portion 3 are disposed as a pair on either side of the tire lateral direction so as to sandwich the tread portion 2.

The side portion 4 extends continuously in a circular shape about the rotation axis Axis of the tire 1 and includes continuous protrusions 41 and 42 which mutually differ in diameters. The side portion 4 includes decorative portions 5 decorated with a decorative element described below. The decorative portions 5 are formed in annular regions surrounded by the continuous protrusion 41 and the continuous protrusion 42. In the example illustrated in FIG. 1, the decorative portions 5 are provided at two opposing locations on the tire circumference. In addition to the decorative portions 5, the side portion 4 also includes marking display portions 6 for displaying markings including alphanumerics, graphics, and the like indicating brand names, tire sizes, and other features. The marking display portions 6 are disposed in the annular regions so as to be sandwiched by the two decorative portions 5. Note that in FIG. 1, the marking display portions 6 are illustrated as a smooth surface with no recesses/protrusions and with the markings omitted.

Figure 2:
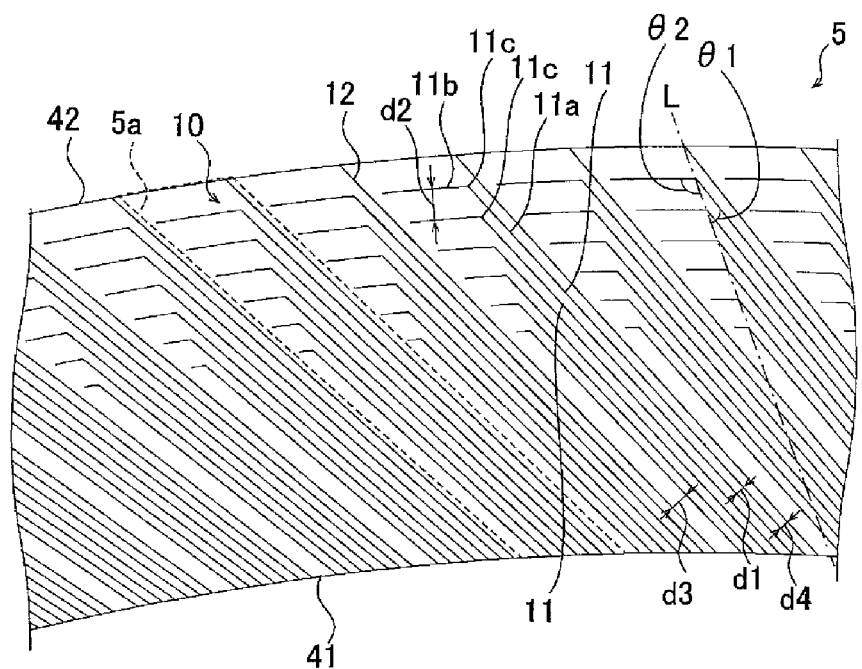
FIG. 2 is a diagram illustrating an example of a decorative element on a side portion.

FIG. 2 is a diagram illustrating an example of a decorative element 10.

Now, the decorative element 10 included in the decorative portion 5 will be described.

As illustrated in FIG. 2, the decorative element 10 consists of a plurality of protrusions 11. Each protrusion 11 extends along the surface of the side portion 4 and bends to form a hook shape. The plurality of protrusions 11 are disposed at intervals from each other with tips of the hooks aligned in the same direction. A "hook" refers to a metal or wooden instrument with a bent tip, and "hook shape" refers to the shape of the protrusion 11 that mimics the shape of a hook.

"Tips of the hooks aligned in the same direction" refers to a state where the direction in which second portions 11b (described later) extend (extending direction of second portions) from bend positions 11c of the linear protrusions 11, for all of the plurality of linear protrusions 11, has a component facing the same side in the tire circumferential direction or a component facing the outer side in the tire radial direction. In the example illustrated in FIG. 2, the extending direction of the second portions 11b has a component facing the left side in the tire circumferential direction.

Each of the protrusions 11 includes a first portion 11a and the second portion 11b.

The first portion 11a is a portion extending from the inner side in the tire radial direction toward the outer side in the tire radial direction.

The second portion 11b is a portion extending from the bend position 11c forming an angle of 90° or greater (θ1+θ2 in FIG. 2) with the first portion 11a at the bend position 11c of the protrusion 11. The first portion 11a and the second portion 11b are portions of the protrusion 11 that extend linearly. In FIG. 2 and the example shown in FIG. 3 which will be referenced later, the second portion 11b is connected to the first portion 11a at the bend position 11c.

The height of each protrusion 11 is, for example, from 0.2 mm to 0.5 mm. The height of each protrusion 11 is the protrusion height from a portion (valley) with maximum depth between adjacent protrusions 11. In FIG. 1 to FIG. 4, each protrusion 11 is illustrated as a line representing a portion at which height of the protrusion 11 is at a maximum (top portion).

Each protrusion 11 has a cross-sectional shape of a polygon such as a triangle or a trapezoid, an arc, an oval or the like in a plane orthogonal to the extending direction of the protrusions 11.

The width of each protrusion 11 is, for example, from 0.2 mm to 0.5 mm. "Width of each protrusion 11" refers to the maximum length of each protrusion 11 in a direction orthogonal to the extending direction of the protrusions 11, that is, the interval between adjacent valleys.

In the decorative element 10, the positions of the bend positions 11c in the tire radial direction mutually differ between protrusions 11, and the interval between adjacent protrusions 11 is wider at the second portion 11b than at the first portion 11a. That is, in FIG. 2, an interval d1 between adjacent first portions 11a and an interval d2 between adjacent second portions 11b satisfies d2>d1. An "interval between adjacent portions" refers to the length along a direction orthogonal to the extending direction of one protrusion 11 among two adjacent protrusions 11, for example, a protrusion 11 in which the second portion 11b is located on the outer side in the tire radial direction.

In the present embodiment, since the position of the bend position 11c in the tire radial direction mutually differ between each of the plurality of protrusions 11, the interval d2 between adjacent second portions 11b can be set wider than the interval d1 between adjacent first portions 11a without causing the first portions 11a to be substantially inclined with respect to the tire radial direction. If the first portions 11a are greatly inclined with respect to the tire radial direction, dirt that has adhered to the first portions 11a is difficult to move outward in the tire radial direction by centrifugal force caused from rotation of the tire 1, and the dirt may remain while moving in the tire radial direction. The dirt is big enough to cover several of the protrusions 11, for example.

In the present embodiment, the contact area between the protrusions 11 and the dirt is small in a region where the second portion 11b is located and the dirt is more likely to move in this region than in a region where the first portion 11a is located, because the interval d2 between adjacent second portions 11b is wider than the interval d1 between adjacent first portions 11a. Thus, dirt that has moved along the first portions 11a to the bend positions 11c is smoothly discharged from the decorative region 5a through the region of the second portion 11b. Through exhibiting such a self-cleaning function during travel, if fluid dirt such as mud or muddy water adheres to the side portion 4, the dirt is removed before drying and the surface of the side portion 4 is easily kept clean. Because the contact area with dirt is small in the region of the second portion 11b, an effect of moving across the second portion 11b to outer side in the tire radial direction when centrifugal force is large is also achieved.

In the present embodiment, the smaller angle (bend angle) of the angles formed between the first portion 11a and the second portion 11b is 90° or greater, and thus ease of movement of dirt near the bend position 11c is ensured. When the bend angle is an acute angle, the dirt is likely to be held at the bend positions 11c and remain.

Preferably, the interval d2 between the second portions 11b is two to five times the interval d1 between the first portions 11a. If the interval d2 is less than twice the interval d1, the effect of smoothly discharging the dirt is reduced. If the interval d2 exceeds five times the interval d1, the number of second portions 11b that can be disposed in the decorative portion 5 becomes limited, and the effect of making the appearance of the recesses/protrusions on the surface of the side portion 4 to be inconspicuous may be impaired.

According to one embodiment, the interval between adjacent protrusions 11 preferably widens stepwise or continuously as the interval advances from an inner end of the first portion 11a in the tire radial direction toward the tip of the second portion 11b. In the example illustrated in FIG. 2, the interval stepwise widens with the bend position 11c as a boundary. According to such an aspect, the interval between the protrusions 11 does not narrow from the inner end toward the tip in the tire radial direction, and the dirt easily moves. When the interval includes a narrow portion, even if the relationship of d2>d1 is satisfied, dirt that has adhered to the decorative element 10 may remain partway.

According to one embodiment, extending directions of the second portions 11b are mutually parallel between the plurality of protrusions 11. By making the extending directions of the second portions 11b mutually parallel, the widths of the intervals d2 are maintained across the extending directions of the second portions 11b, and the effect of smoothly discharging dirt can be ensured. As described above, when the interval d2 is narrow from the bend position 11c to the tip, the dirt may remain partway. When the interval d2 is wide from the bend position 11c to the tip, the occupancy area of the first portion 11a in the decorative element 10 decreases, which may reduce rubber flow properties when molding the tire 1.

Preferably, the plurality of intervals d2 in the region of the second portions 11b are equidistant. When the intervals d2 are not equidistant, there may be variation in how easily the dirt moves depending on the position at which the dirt adhered.

According to one embodiment, the extending directions of the first portions 11a are substantially mutually parallel between the protrusions 11. More specifically, the inclination angles of the first portions 11a with respect to the tire radial direction at an ends of the first portions 11a in the inner side in the tire radial direction are preferably identical between the protrusions 11. With this configuration, the intervals d1 are maintained across the extending directions of the first portions 11a, and the effect of the dirt moving outward in the tire radial direction is easily ensured.

Preferably, the plurality of intervals d1 in the region of the first portions 11a are equidistant. When the intervals d1 are not equidistant, there may be variation in how easily the dirt moves depending on the position at which the dirt adhered.

According to one embodiment, the length of the second portion 11b in the extending direction preferably increases as the bend position 11c of the protrusion 11 is located further outward in the tire radial direction. A decorative element 10 is more likely to be a path along which the dirt moves by subjected to centrifugal force, when the decorative element 10 is located further outward in the tire radial direction. Thus, increasing the length of the second portion 11b as the protrusion 11 is located further outward in the tire radial direction reduces the size of the region of the interval-dense first portion 11a and allows dirt to move easily. Additionally, if dirt that has adhered to the surface of the side portion 4 is above the rotation axis Axis, the dirt may drip downward due to gravity when the vehicle is stopped or travels at a low speed. Thus, by increasing the length of the second portions 11b as the protrusion 11 is located further outward in the tire radial direction, it is possible to hold dirt in the region of the second portions 11b and suppress the dirt from dripping down as described above.

Preferably, among the plurality of second portions 11b in the region of the second portions 11b, the second portion 11b with the longest length in the extending direction is two to ten times the length of the second portion 11b with the shortest length in the extending direction.

The length of the first portion 11a also preferably increases as the bend position 11c of the protrusion 11 is located further outward in the tire radial direction.

Preferably, among the first portions 11a of the protrusions 11, the first portion 11a with the longest length in the extending direction is 1.2 to 20 times, more preferably 1.4 to 20 times, longer than the first portion 11a with the shortest extending direction length. When this number of times is too small, the intervals d2 between the second portions 11b tend to become narrower. When the number of times is too large, the effect of moving dirt to the outer side in the tire radial direction may not be sufficiently obtained.

According to one embodiment, the length of the first portion 11a in the extending direction is preferably longer than the length of the second portion 11b in the extending direction, and the ratio of the length of the second portion 11b in the extending direction to the length of the first portion 11a in the extending direction preferably increases as the bend position 11c of the protrusion 11 is located further outward in the tire radial direction. By setting the length of the first portion 11a long, the dirt can be reliably moved to the outer side in the tire radial direction. Additionally, by increasing the above ratio as the bend position 11c of the protrusion 11 is located further outward in the tire radial direction, an interval d3 (described below) is suppressed from becoming too wide with respect to the interval d1. Further, rubber flow properties during tire molding can be achieved to a high degree in a compatible manner with the effect of keeping the surface of the side portion 4 clean.

According to one embodiment, the bend position 11c in the plurality of protrusions 11 is preferably located on an imaginary straight line L extending from the inner side in the tire radial direction toward the outer side in the tire radial direction. Such a configuration is preferable in that the decorative element 10 that has a form satisfying the relationship of d2>d1 is easy to manufacture.

Preferably, the bend positions 11c of the plurality of protrusions 11 are arranged at equal intervals on the straight line L.

In this embodiment, as illustrated in FIG. 2, the straight line L preferably extends in a direction that intersects with each of the extending direction of the first portion 11a and the extending direction of the second portion 11b, and an angle θ2, which is the smaller angle formed with the second portion 11b, is preferably greater than an angle θ1, which is the smaller angle formed with the first portion 11a. Such a configuration is preferable in that the decorative element 10 that has a form satisfying d2>d1 is easy to manufacture.

According to one embodiment, ends of the second portions 11b closer to the tips are preferably aligned in a direction parallel with the extending direction of the first portion 11a.

Additionally, the ends of the first portions 11a in the inner side in the tire radial direction are preferably aligned along a direction parallel with the extending directions of the second portions 11b.

According to one embodiment, the second portion 11b preferably extends at an inclination angle of 45° or less with respect to a tire circumferential direction. If the inclination angle of the extending direction of the second portion 11b with respect to the tire circumferential direction exceeds 45°, it may be necessary to greatly incline the extending direction of the first portion 11a with respect to the tire radial direction in order to widen the interval d2. Thus, even if the dirt is subjected to centrifugal force, the dirt is less likely to move outward in the tire radial direction and may remain. In light of this, the inclination angle of the extending direction of the second portion 11b with respect to the tire circumferential direction is preferably 30° or less, more preferably 15° or less, and particularly preferably 0°.

According to one embodiment, the first portion 11a preferably extends at an incline with respect to the tire radial direction and the tire circumferential direction. Such a configuration is preferable because the bend angle of each protrusion 11 tends to be a large obtuse angle. When the bend angle of the protrusion 11 is a large obtuse angle (for example, from 120 to 150°), dirt that has adhered to the decorative element 10 is less likely to remain at the bend position 11c. In this regard, the inclination angle of the first portion 11a with respect to the tire radial direction is preferably 30° or greater. On the other hand, when the inclination angle of the first portion 11a with respect to the tire radial direction is too large, the dirt is less likely to move and may remain. Thus, the inclination angle is preferably 60° or less.

According to one embodiment, the bend positions 11c of 80% or more of the plurality of protrusions 11 of the total number of protrusions 11 included in the decorative element 10 are located further outward in the tire radial direction than a position in the tire radial direction at which the tire maximum width is located. Such a configuration is preferable in that a region in which intervals between the protrusions 11 are wide can be ensured in a region of the decorative element 10 in the outer side in the tire radial direction. More preferably, the ratio is greater than or equal to 90%, more preferably 100%, of the total number of protrusions 11.

Note that the total number of protrusions 11 included in one decorative element 10 is two or more, for example, from three to 15. In the example illustrated in FIG. 2, the total number of protrusions 11 is six.

According to one embodiment, the side portion 4 preferably includes the decorative element 10 in each of a plurality of the regions 5a aligned in the tire circumferential direction. In the example illustrated in FIG. 2, the plurality of regions 5a are defined by imaginary straight lines that is located at equal intervals in the tire circumferential direction and inclined with respect to the tire radial direction at the same inclination angle as the first portion 11a. In this case, adjacent decorative elements 10 are preferably disposed at intervals d3, which are wider than the intervals d1 between adjacent first portions 11a in the region 5a. When the interval d3 between the decorative elements 10 is wide, dirt that has adhered to the regions between the decorative elements 10 is more likely to move toward the outer side in the tire radial direction. On the other hand, if the interval d3 between the decorative elements 10 is too wide, rubber flow properties during tire molding may decrease. In light of this, the interval between the decorative elements 10 is preferably from 1.5 to 5 times the interval d1. The number of regions 5a included in one decorative portion 5 is, for example, from 30 to 70.

Note that the interval d3 is the length along the same direction as the interval d1 and, in the example illustrated in FIG. 2, the interval d3 is the length along a direction orthogonal to the extending direction of the first portion 11a.

According to one embodiment, defining the protrusions 11 as first protrusions 11, second protrusions 12 are preferably disposed in the regions 5a in addition to the first protrusions 11. The second protrusions 12 are extending from the inner side in the tire radial direction toward the outer side in the tire radial direction without being bent and disposed at intervals d4 from the first portions 11a of the first protrusions 11. When the second protrusion 12 is provided, a region located further outward in the tire radial direction than the second portion 11b is partitioned between adjacent regions 5a, to obtain an effect in which the dirt is guided to the outer side in the tire radial direction even when, for example, traveling at low speeds. The interval d4 between the second protrusion 12 and the first protrusion 11 is, for example, equal to the interval d1 between the first portions 11a.

Preferably, the tip of the second protrusion 12 in the outer side in the tire radial direction is located on the straight line L that joins the bend positions 11c.

Figure 3:
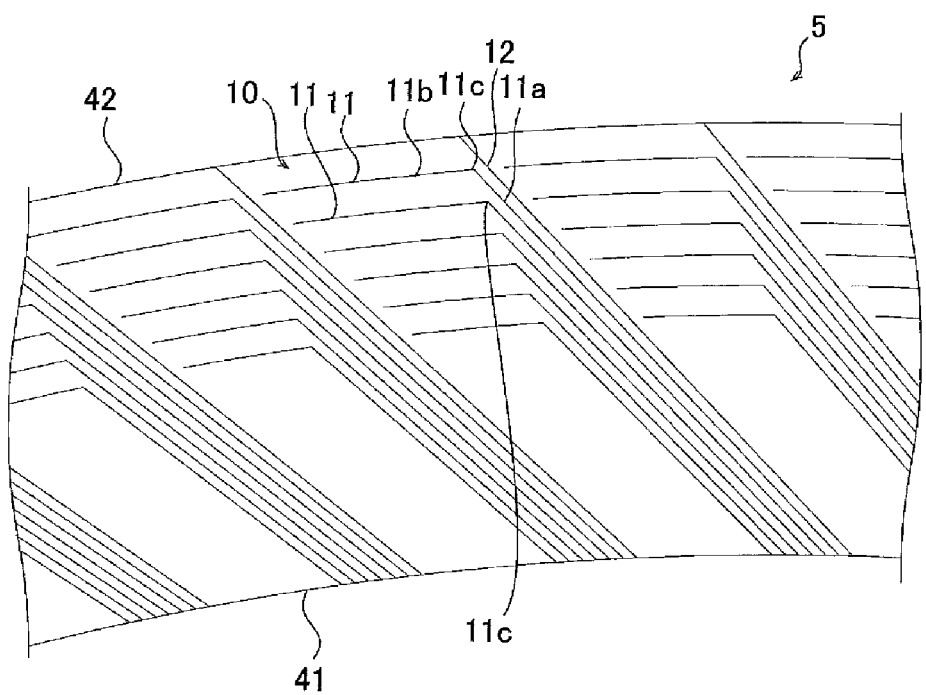
FIG. 3 is a diagram illustrating another example of a decorative element on a side portion.
Figure 4:
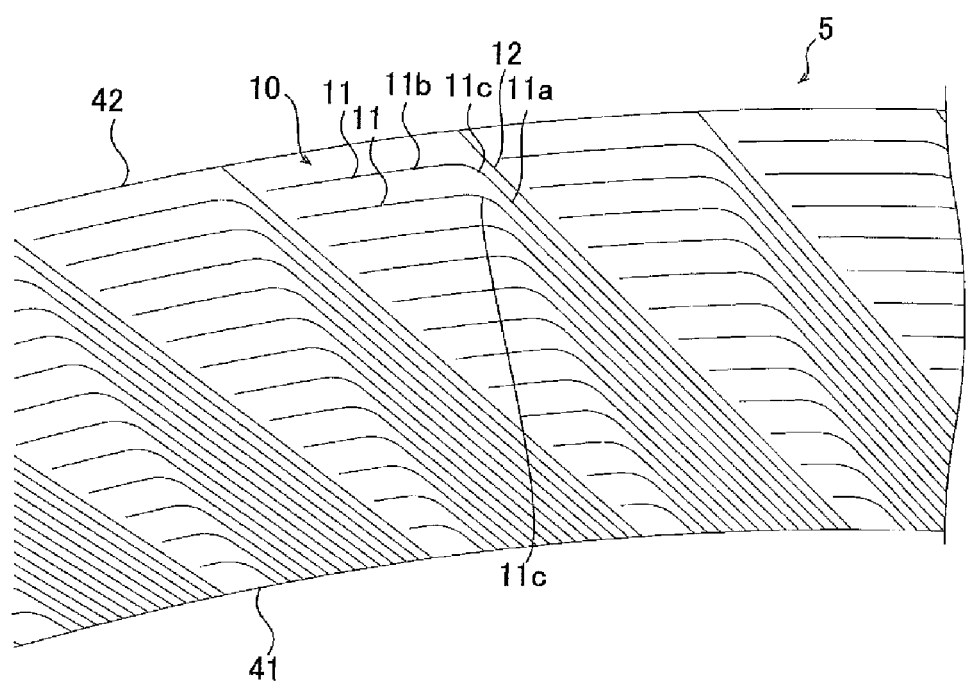
FIG. 4 is a diagram illustrating another example of a decorative element on a side portion.

In the present embodiment, the decorative element 10 can take various forms and, in addition to the embodiment illustrated in FIG. 2, can take the embodiments illustrated in FIG. 3 and FIG. 4, for example. FIG. 3 and FIG. 4 are diagrams illustrating other examples of the decorative element 10 on the side portion 4.

According to one embodiment, as in the example illustrated in FIG. 3, the above-described ratio may be constant between the protrusions 11, or, as in the example illustrated in FIG. 4, the bend position 11c may become smaller as the protrusion 11 is located further outward in the tire radial direction. With these forms, the interval d3 is easier to make wider than the interval d1, and the effect of keeping the surface of the side portion 4 clean is improved.

The protrusion 11 may be curved at the bend position 11c as in the example shown in FIG. 4. In the example illustrated in FIG. 4, the bend position 11c is a curved portion that connects the first portion 11a and the second portion 11b. The bend position 11c has an arc shape with a radius of, for example, 5 mm or less.

According to this embodiment, the positions of the bend positions 11c in the tire radial direction mutually differ between the plurality of protrusions 11, and the interval d2 between adjacent second portions 11b can be made wider than the interval d1 between adjacent first portions 11a without causing the first portions 11a to be greatly inclined in the tire radial direction. In the present embodiment, the contact area between the protrusions 11 and the dirt is small in the region where the second portion 11b is located, and the dirt is more likely to move in this region than in the region where the first portion 11a is located, because the interval d2 between adjacent second portions 11b is wider than the interval d1 between adjacent first portions 11a. Thus, dirt that has moved along the first portions 11a to the bend positions 11c is smoothly discharged from the decorative region 5a through the region of the second portion 11b. Through exhibiting such a self-cleaning function during travel, if fluid dirt such as mud or muddy water adheres to the side portion 4, the dirt is removed before drying and the surface of the side portion 4 is easily kept clean. Comparative Examples, Examples In order to examine the effects of the pneumatic tire according to this embodiment, various tires were manufactured. The decorative element on the side portion of each tire differs in form. Each manufactured tire (tire size: 265/50R20 111W) was provided with a decorative portion based on the decorative element illustrated in FIG. 2 on the side portion illustrated in FIG. 1, excluding the points shown in the table and the following points.

The height of each protrusion 11 is 0.3 mm, the width of each protrusion 11 is 0.6 mm, and the interval d1 between the first portions 11a is from 1 to 2 mm.

The inclination angle of the first portion 11a with respect to the tire radial direction is 45°.

The length of the first portion 11a in the extending direction is from 33 to 56 mm, and the length of the second portion 11b in the extending direction is from 1.5 to 9 mm.

The form of the decorative element in each tire and the evaluation results thereof are shown in Table 1.

Figure 5:
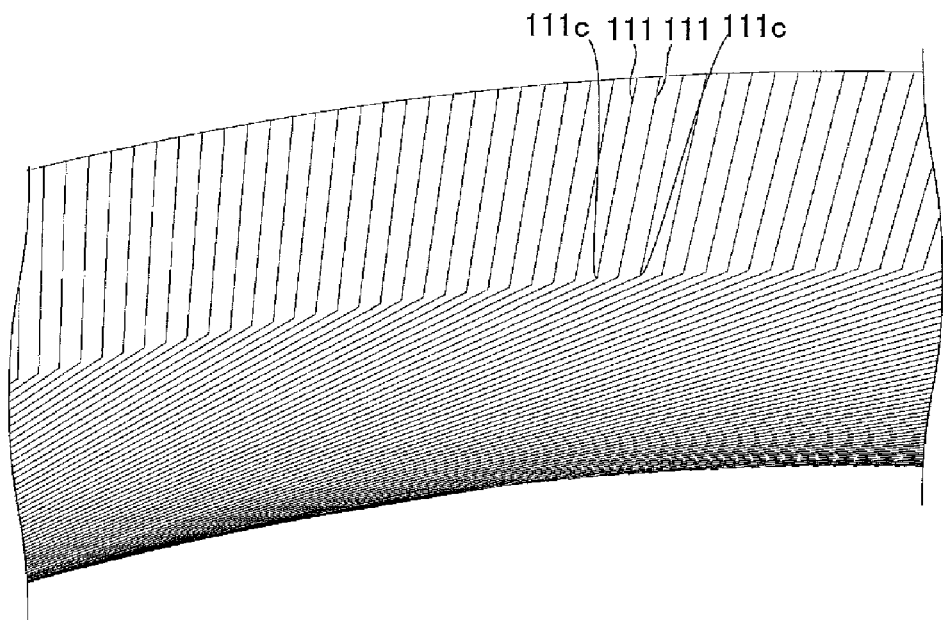
FIG. 5 is a diagram illustrating a decorative element on a side portion of a tire according to Comparative Example 1.

A decorative element with the form illustrated in FIG. 5 was used as the decorative element in Comparative Example 1. In Comparative Example 1, bend positions 111c of protrusions 111 are all located at the tire maximum width position.

The decorative element in Comparative Example 3 has an embodiment in which the first portion 11a is inclined with respect to the tire radial direction such that the second portion 11b extends in the tire circumferential direction and the bend angle of the protrusion 11 is 80°.

The decorative element illustrated in FIG. 3 is used as the decorative element in Example 2 instead of the decorative element illustrated in FIG. 2. Note that the size of d3 relative to d1 in Example 2 is greater than in Example 1.

The decorative element illustrated in FIG. 4 is used as the decorative element in Example 3 instead of the decorative element illustrated in FIG. 2. In the table, Length ratio of second portion to first portion" refers to how the magnitude of the above-described ratio varies between the protrusions in the inner side in the tire radial direction and the protrusions in the outer side in the tire radial direction. "Small→large" indicates a larger ratio, and "Large→small" indicates a smaller ratio. Note that the ratio for the protrusions 11 located outermost in the tire radial direction was 0.25 in Comparative Example 1, 0.17 in Comparative Examples 2 and 3 and Examples 1, 4 and 5, and 0.40 in Examples 2 and 3.

Dirt Release

The manufactured tire was mounted to a rim (rim size: 20×8.5 J) (air pressure at 250 kPa), and an SUV vehicle with an engine displacement of 3.6 liter was used as a test vehicle. The vehicle was traveled 10 km at within the range of from 0 to 80 km/hr on a test course provided with a quagmire. Then, 10 panelists stood to the side of the test vehicle at a position for viewing the side portion in a front view, visually observed and scored the dirtiness based on the following judgment criteria. The tire was given the grade "A" when the total score was between 36 to 40, the grade "B" when the total score was between 26 to 35, the grade "C" when the total score was between 16 to 25, and the grade "D" if the total score was between 10 to 15. As a result, tires given the grade "A" or "B" were evaluated as having excellent dirt release properties.

Score: Judgment Criteria
4: Looks very clean.
3: Looks relatively clean.
2: Looks relatively dirty.
1: Looks very dirty.

TABLE 1

|  | Comparative Example 1 | Comparative Example 2 | Comparative Example 3 | Example 1 |
|---|---|---|---|---|
| Basic decorative element form | FIG. 5 | FIG. 2 | FIG. 2 | FIG. 2 |
| Direction of bend position alignment | Tire circumferential direction | Tire radial direction | Tire radial direction | Tire radial direction |
| Size relationship between d2 and d1 | d2 > d1 | d2 < d1 | d2 > d1 | d2 > d1 |
| d2/d1 | 2 | 1/2 | 3 | 3 |
| Bend angle [°] | 135 | 135 | 80 | 135 |
| Inclination angle of first portion with respect to tire radial direction [°] | 70 | 45 | 10 | 45 |
| Length ratio of second portion to first portion | Constant | Small → large | Small → large | Small → large |
| Size relationship between d3 and d1 | d3 = d1 | d3 > d1 | d3 > d1 | d3 > d1 |
| Dirt Release | C | D | C | B |

TABLE 1-continued

|  | Example 2 | Example 3 | Example 4 | Example 5 |
|---|---|---|---|---|
| Basic decorative element form | FIG. 3 | FIG. 4 | FIG. 2 | FIG. 2 |
| Direction of bend position alignment | Tire radial direction | Tire radial direction | Tire radial direction | Tire radial direction |
| Size relationship between d2 and d1 | d2 > d1 | d2 > d1 | d2 > d1 | d2 > d1 |
| d2/d1 | 3 | 3 | 6 | 3 |
| Bend angle [°] | 135 | 135 | 135 | 120 |
| Inclination angle of first portion with respect to tire radial direction [°] | 45 | 45 | 45 | 30 |
| Length ratio of second portion to first portion | Large → small | Constant | Small → large | Small → large |
| Size relationship between d3 and d1 | d3 > d1 | d3 > d1 | d3 > d1 | d3 > d1 |
| Dirt Release | A | B | A | B |

Comparing Examples 1 to 5 and Comparative Examples 1 to 3, it can be seen that the tires have excellent dirt release properties, in which the positions of the bend positions of the protrusions in the tire radial direction mutually differ between the protrusions, the relationship of d2>d1 is satisfied, and the bend angle is not less than 90°.

Comparing Example 1 and Example 2, it can be seen that the large size of d3 relative to d1 results in improved dirt release properties.

Comparing Example 1 and Example 4, it can be seen that a greater d2/d1 ratio results in improved dirt release properties.

The foregoing has been a detailed description of the pneumatic tire according to embodiments of the present technology. However, the pneumatic tire according to an embodiment of the present technology is not limited to the above embodiments or examples, and may of course be enhanced or modified in various ways within the scope of the present technology.

The invention claimed is:

1. A pneumatic tire, comprising:
a side portion located between a tread portion and a bead portion comprising a decorative element, the decorative element comprising a plurality of protrusions extending along a surface of the side portion, each protrusion of the plurality of protrusions bending to form a hook shape, the plurality of protrusions being disposed at intervals with a tip of the hook shape of each protrusion aligned in a same direction, wherein
each one of the plurality of protrusions comprises a first portion and a second portion, the first portion is extending linearly from an inner side in a tire radial direction to an outer side in the tire radial direction, the second portion is extending linearly from a bend position of each one of the plurality of protrusions to the tip and forming an angle of 90° or greater with the first portion at the bend position, each one of the plurality of protrusions has opposing ends in an extending direction thereof, the opposing ends are an end of the first portion and an end of the second portion, and the opposing ends are opposite to the bend position,
each bend position mutually differs in position in the tire radial direction between the plurality of protrusions, and the interval between adjacent protrusions is wider at the second portion than at the first portion,
lengths of the second portions in extending directions differ between the plurality of protrusions, and
the first portion and the second portion incline with respect to the tire radial direction such that an outer end in the tire radial direction of the first portion and an outer end in the tire radial direction of the second portion are disposed in the same side in the tire circumferential direction with respect to the tire radial direction.

2. The pneumatic tire according to claim 1, wherein the interval between adjacent protrusions widens stepwisely or continuously as the interval advances from an inner end of the first portion in the tire radial direction toward the tip of the second portion.

3. The pneumatic tire according to claim 1, wherein extending directions of the second portions are mutually parallel between the plurality of protrusions.

4. The pneumatic tire according to claim 1, wherein the bend positions comprised in the decorative element are located on a straight line extending from the inner side in the tire radial direction to the outer side in the tire radial direction.

5. The pneumatic tire according to claim 4, wherein,
the straight line extends so as to intersect with each of an extending direction of the first portion and an extending direction of the second portion; and
an angle formed between the straight line and the second portion is larger than an angle formed between the straight line and the first portion.

6. The pneumatic tire according to claim 1, wherein the first portion extends at an incline with respect to the tire radial direction and a tire circumferential direction.

7. The pneumatic tire according to claim 1, wherein
the side portion comprises the decorative element in each of a plurality of regions aligned in a tire circumferential direction, and
the decorative elements are disposed at an interval greater than an interval between adjacent first portions in the plurality of regions.

8. The pneumatic tire according to claim 7, wherein,
defining the plurality of protrusions as first protrusions, second protrusions are disposed in the regions in addition to the first protrusions,
the second protrusions are extending from the inner side in the tire radial direction toward the outer side in the tire radial direction without being bent and disposed at intervals from the first portions of the first protrusions.

9. The pneumatic tire according to claim 8, wherein adjacent second protrusions in the tire circumferential direction sandwich the plurality of first protrusions therebetween.

10. The pneumatic tire according to claim 1, wherein the second portion is located at an outer end in the tire radial direction of each one of the plurality of protrusions.

11. The pneumatic tire according to claim 1, wherein the bend position is located at an outer side in the tire radial direction of each one of the plurality of protrusions.

12. The pneumatic tire according to claim 1, wherein the second portion extends at an inclination angle of 30° or less with respect to a tire circumferential direction.

13. The pneumatic tire according to claim 1, wherein the second portion extends at an inclination angle of 0° with respect to a tire circumferential direction.

14. The pneumatic tire according to claim 1, wherein each bend position is located inside a tire circumferential region that each one of the plurality of protrusions is disposed.

15. A pneumatic tire, comprising:
a side portion located between a tread portion and a bead portion comprising a decorative element, the decorative element comprising a plurality of protrusions extending along a surface of the side portion, each protrusion of the plurality of protrusions bending to form a hook shape, the plurality of protrusions being disposed at intervals with tips of the hook shape of each protrusion aligned in a same direction, wherein
each one of the plurality of protrusions comprises a first portion and a second portion, the first portion is extending linearly from an inner side in a tire radial direction to an outer side in the tire radial direction, the second portion is extending linearly from a bend position of each one of the plurality of protrusions and forming an angle of 90° or greater with the first portion at the bend position, each one of the plurality of protrusions has opposing ends in an extending direction thereof, the opposing ends are an end of the first portion and an end of the second portion, and the opposing ends are opposite to the bend position,
each bend position mutually differs in position in the tire radial direction between the plurality of protrusions, and the interval between adjacent protrusions is wider at the second portion than at the first portion, and
a length of the second portion in an extending direction increases as the bend position of each one of the plurality of protrusions is located further outward in the tire radial direction.

16. A pneumatic tire, comprising:
a side portion located between a tread portion and a bead portion comprising a decorative element, the decorative element comprising a plurality of protrusions extending along a surface of the side portion, each protrusion of the plurality of protrusions bending to form a hook shape, the plurality of protrusions being disposed at intervals with tips of the hook shape of each protrusion aligned in a same direction, wherein
each one of the plurality of protrusions comprises a first portion and a second portion, the first portion is extending linearly from an inner side in a tire radial direction to an outer side in the tire radial direction, the second portion is extending linearly from a bend position of each one of the plurality of protrusions and forming an angle of 90° or greater with the first portion at the bend position, each one of the plurality of protrusions has opposing ends in an extending direction thereof, the opposing ends are an end of the first portion and an end of the second portion, and the opposing ends are opposite to the bend position,
each bend position mutually differs in position in the tire radial direction between the plurality of protrusions, and the interval between adjacent protrusions is wider at the second portion than at the first portion,
a length of the first portion in an extending direction is longer than a length of the second portion in an extending direction, and
a ratio of the length of the second portion in the extending direction to the length of the first portion in the extending direction increases as the bend position of each one of the plurality of protrusions is located further outward in the tire radial direction.

17. A pneumatic tire, comprising:
a side portion located between a tread portion and a bead portion comprising a decorative element, the decorative element comprising a plurality of protrusions extending along a surface of the side portion, each protrusion of the plurality of protrusions bending to form a hook shape, the plurality of protrusions being disposed at intervals with tips of the hook shape of each protrusion aligned in a same direction, wherein
each one of the plurality of protrusions comprises a first portion and a second portion, the first portion is extending linearly from an inner side in a tire radial direction to an outer side in the tire radial direction, the second portion is extending linearly from a bend position of each one of the plurality of protrusions and forming an angle of 90° or greater with the first portion at the bend position, each one of the plurality of protrusions has opposing ends in an extending direction thereof, the opposing ends are an end of the first portion and an end of the second portion, and the opposing ends are opposite to the bend position,
each bend position mutually differs in position in the tire radial direction between the plurality of protrusions, and the interval between adjacent protrusions is wider at the second portion than at the first portion,
ends of the second portions closer to the tips are aligned in a direction parallel with an extending direction of the first portion,
lengths of the second portions in extending directions differ between the plurality of protrusions, and
the first portion and the second portion incline with respect to the tire radial direction such that an outer end in the tire radial direction of the first portion and an outer end in the tire radial direction of the second portion are disposed in the same side in the tire circumferential direction with respect to the tire radial direction.

18. A pneumatic tire, comprising:
a side portion located between a tread portion and a bead portion comprising a decorative element, the decorative element comprising a plurality of protrusions extending along a surface of the side portion, each protrusion of the plurality of protrusions bending to form a hook shape, the plurality of protrusions being disposed at intervals with tips of the hook shape of each protrusion aligned in a same direction, wherein
each one of the plurality of protrusions comprises a first portion and a second portion, the first portion is extending linearly from an inner side in a tire radial direction to an outer side in the tire radial direction, the second portion is extending linearly from a bend position of each one of the plurality of protrusions and forming an angle of 90° or greater with the first portion at the bend position, each one of the plurality of protrusions has opposing ends in an extending direction thereof, the opposing ends are an end of the first portion and an end of the second portion, and the opposing ends are opposite to the bend position, each bend position mutually differs in position in the tire radial direction between the plurality of protrusions, and the interval between adjacent protrusions is wider at the second portion than at the first portion, the second portion extends at an inclination angle of 45° or less with respect to a tire circumferential direction, lengths of the second portions in extending directions differ between the plurality of protrusions, and the first portion and the second portion incline with respect to the tire radial direction such that an outer end in the tire radial direction of the first portion and an outer end in the tire radial direction of the second portion are disposed in the same side in the tire circumferential direction with respect to the tire radial direction.

19. A pneumatic tire, comprising:

a side portion located between a tread portion and a bead portion comprising a decorative element, the decorative element comprising a plurality of protrusions extending along a surface of the side portion, each protrusion of the plurality of protrusions bending to form a hook shape, the plurality of protrusions being disposed at intervals with a tip of the hook shape of each protrusion aligned in a same direction, wherein each one of the plurality of protrusions comprises a first portion and a second portion, the first portion is extending linearly from an inner side in a tire radial direction to an outer side in the tire radial direction, the second portion is extending linearly from a bend position of each one of the plurality of protrusions to the tip and forming an angle of 90° or greater with the first portion at the bend position, each one of the plurality of protrusions has opposing ends in an extending direction thereof, the opposing ends are an end of the first portion and an end of the second portion, and the opposing ends are opposite to the bend position, each bend position mutually differs in position in the tire radial direction between the plurality of protrusions, and the interval between adjacent protrusions is wider at the second portion than at the first portion, and the bend positions of 80% or more of the plurality of protrusions of a total number of the plurality of protrusions comprised in the decorative element are located further outward in the tire radial direction than a position in the tire radial direction at which a tire maximum width is located.

* * * * *